United States Patent
Bergan et al.

(10) Patent No.: US 10,591,224 B2
(45) Date of Patent: Mar. 17, 2020

(54) CONCRETE THERMAL ENERGY STORAGE CONTAINING CONCRETE THERMAL ENERGY STORAGE ELEMENTS ARRANGED IN CASSETTES THAT ARE SELF-SUPPORTING WITH RESPECT TO TRANSPORT AND INSTALLATION, METHOD OF BUILDING AND METHODS OF OPERATING SAID STORAGE

(71) Applicant: EnergyNest AS, Billingstad (NO)

(72) Inventors: Pål G. Bergan, Nesøya (NO); Christopher Greiner, Vøyenenga (NO); Nils Høivik, Nesøya (NO)

(73) Assignee: EnergyNest AS, Billingstad (NO)

( * ) Notice: Subject to any disclaimer, the term of this patent is extended or adjusted under 35 U.S.C. 154(b) by 167 days.

(21) Appl. No.: 15/536,585

(22) PCT Filed: Dec. 18, 2015

(86) PCT No.: PCT/NO2015/050252
§ 371 (c)(1),
(2) Date: Jun. 15, 2017

(87) PCT Pub. No.: WO2016/099289
PCT Pub. Date: Jun. 23, 2016

(65) Prior Publication Data
US 2018/0003445 A1   Jan. 4, 2018

(30) Foreign Application Priority Data

Dec. 19, 2014   (NO) .................................. 20141546

(51) Int. Cl.
*F28D 20/00* (2006.01)
*F28D 20/02* (2006.01)
*F28D 1/047* (2006.01)

(52) U.S. Cl.
CPC ......... *F28D 20/00* (2013.01); *F28D 20/0056* (2013.01); *F28D 20/02* (2013.01);
(Continued)

(58) Field of Classification Search
CPC ...... F28D 20/00; F28D 20/0056; F28D 20/02; F28D 20/0034; F28D 20/021;
(Continued)

(56) References Cited

U.S. PATENT DOCUMENTS 3,381,113 A   4/1968   Jacques et al.
3,624,356 A   11/1971  Havill
(Continued)

FOREIGN PATENT DOCUMENTS

DE   10211598 A1   9/2002
DE   10350879 A1   1/2005
(Continued)

OTHER PUBLICATIONS

Markovic, Nebojsa, "International Search Report," prepared for PCT/NO2015/050252, dated Mar. 10, 2016, three pages.
(Continued)

*Primary Examiner* — Travis C Ruby
(74) *Attorney, Agent, or Firm* — Winstead PC (57) ABSTRACT

A high temperature thermal energy storage includes a foundation comprising thermal insulation, at least one self-supported cassette arranged on the foundation. At least one cassette is a self-supporting frame or assembled structure with respect to transport and installation, containing a number of concrete thermal energy storage elements, some or all of the elements include heat exchangers embedded in the concrete of the elements. A pipe system includes an inlet and an outlet for thermal input to and output from the storage, respectively. The pipe system is fluidly coupled to the heat exchangers for circulating fluid through the heat exchangers
(Continued)

for thermal energy input to or output from the elements and thermal insulation around and on top of the at least one self-supported cassette containing concrete thermal energy storage elements.

18 Claims, 6 Drawing Sheets

(52) U.S. Cl.
CPC ........ *F28D 1/0477* (2013.01); *F28D 20/0034* (2013.01); *F28D 20/021* (2013.01); *F28D 2020/0021* (2013.01); *F28D 2020/0078* (2013.01); *F28D 2020/0082* (2013.01); *Y02E 60/142* (2013.01); *Y02E 60/145* (2013.01)

(58) Field of Classification Search
CPC ............... F28D 1/0477; F28D 1/0475; F28D 2020/0021; F28D 2020/0078; F28D 2020/0082

See application file for complete search history.

(56) References Cited

U.S. PATENT DOCUMENTS

| | | | |
|---|---|---|---|
| 4,010,731 A | 3/1977 | Harrison | |
| 4,085,333 A * | 4/1978 | Grise | F01K 3/00 290/2 |
| 4,194,496 A | 3/1980 | Carlson | |
| 4,203,489 A | 5/1980 | Swiadek | |
| 4,205,656 A | 6/1980 | Scarlata | |
| 4,219,074 A | 8/1980 | Hansen | |
| 4,323,113 A | 4/1982 | Troyer | |
| 4,395,620 A | 7/1983 | Clyde et al. | |
| 4,397,152 A | 8/1983 | Smith | |
| 4,405,010 A | 9/1983 | Schwartz | |
| 4,412,426 A | 11/1983 | Yuan | |
| 4,442,826 A | 4/1984 | Pleasants | |
| 4,452,229 A | 6/1984 | Powers | |
| 4,520,862 A | 6/1985 | Helmbold | |
| 4,524,756 A * | 6/1985 | Laverman | F28D 20/0056 126/400 |
| 5,623,986 A | 4/1997 | Wiggs | |
| 5,694,515 A | 12/1997 | Goswami et al. | |
| 5,816,314 A | 10/1998 | Wiggs et al. | |
| 5,833,394 A | 11/1998 | McCavour | |
| 6,789,608 B1 | 9/2004 | Wiggs | |
| 2002/0053418 A1 | 5/2002 | Hirano | |
| 2004/0011395 A1 | 1/2004 | Nicoletti et al. | |
| 2008/0016866 A1 | 1/2008 | Mohr | |
| 2008/0219651 A1 * | 9/2008 | Nayef | F22B 1/282 392/485 |
| 2010/0199975 A1 | 8/2010 | Bailey | |
| 2011/0017196 A1 | 1/2011 | Bell et al. | |
| 2011/0100586 A1 | 5/2011 | Yang | |
| 2011/0100587 A1 | 5/2011 | Yang | |
| 2011/0226440 A1 | 9/2011 | Bissell et al. | |
| 2011/0247354 A1 | 10/2011 | Asai et al. | |
| 2011/0272319 A1 | 11/2011 | Koivuluoma et al. | |
| 2011/0277470 A1 * | 11/2011 | Benyaminy | F03G 6/06 60/641.8 |
| 2011/0286724 A1 | 11/2011 | Goodman | |
| 2012/0055661 A1 | 3/2012 | Feher | |
| 2012/0285442 A1 | 11/2012 | Hung | |
| 2013/0111904 A1 | 5/2013 | Stiesdal | |
| 2013/0153169 A1 | 6/2013 | Perryman | |
| 2014/0284021 A1 * | 9/2014 | Laurberg | F01K 3/12 165/10 |
| 2016/0320145 A1 | 11/2016 | Bergan et al. | |
| 2017/0363368 A1 | 12/2017 | Bergan et al. | |

FOREIGN PATENT DOCUMENTS

| | | |
|---|---|---|
| DE | 102009036550 A1 | 5/2010 |
| DE | 102011085722 A1 | 5/2013 |
| EP | 0941759 A1 | 9/1999 |
| EP | 2525051 A1 | 11/2012 |
| GB | 2049921 A | 12/1980 |
| GB | 2489011 A | 9/2012 |
| JP | S58-156151 A | 9/1983 |
| JP | 2000-161882 A | 6/2000 |
| JP | 2004-309124 A | 11/2004 |
| JP | 2008-281320 A | 11/2008 |
| JP | 2014-520243 A | 8/2014 |
| NO | 20141540 A1 | 6/2016 |
| WO | WO-9747825 A1 | 12/1997 |
| WO | WO-2006046874 A1 | 5/2006 |
| WO | WO-2008106700 A1 | 9/2008 |
| WO | WO-2010060524 A1 | 6/2010 |
| WO | WO-2012169900 A1 | 12/2012 |
| WO | WO-2014003577 A1 | 1/2014 |
| WO | WO-2014044254 A2 | 3/2014 |
| WO | WO-2015093980 A1 | 6/2015 |
| WO | WO-2016099290 A1 | 6/2016 |

OTHER PUBLICATIONS

U.S. Appl. No. 15/536,566.
Bozis, D. et al., "On the Evaluation of Design Parameters Effects on the Heat Transfer Efficiency of Energy Piles," Energy and Buildings 43, Dec. 28, 2010, pp. 1020-1029.
Laing, D. et al., "Thermal Energy Storage for Direct Steam Generation," Solar Energy 85, Oct. 20, 2010, pp. 627-633.
CETCO Drilling Products, Grouts & Sealants Technical Data, "Geothermal Grout / Enhanced Thermally Conductive Grout", Rev. 1/09.

* cited by examiner

CONCRETE THERMAL ENERGY STORAGE CONTAINING CONCRETE THERMAL ENERGY STORAGE ELEMENTS ARRANGED IN CASSETTES THAT ARE SELF-SUPPORTING WITH RESPECT TO TRANSPORT AND INSTALLATION, METHOD OF BUILDING AND METHODS OF OPERATING SAID STORAGE

FIELD OF INVENTION

The present invention relates to storage and delivery of energy. More specifically, the invention provides a high temperature thermal energy storage having advantages over prior art thermal energy storages, a method of building said storage and a method of operating said storage.

BACKGROUND OF THE INVENTION AND PRIOR ART

Cost effective energy storages, feasible for storing energy from new and traditional sources and delivering the energy when needed, is a "missing link" for improved exploitation of new and existing energy sources.

Storage of energy allows delivery at times when variable sources cannot deliver, providing stability and allowing a larger proportional part of the energy sources to be renewable and friendly to the environment. In addition, the maximum delivery can be increased, since both the sources and the storages can deliver energy at the same time, and the networks for transfer of electrical energy or thermal energy can be smaller since storages can be located where the demand is found.

In patent publication WO 20121169900 A1, a Thermal Energy Storage (TES) is described, having beneficial properties over prior art storages. More specifically, a practical and cost effective solution is provided for a thermal storage using solid-state material as the main storage medium, allowing storage of energy as high temperature heat, which means heat energy at temperature sufficiently high to convert the heat effectively into electric power in a turbine-generator set or equivalent means.

In international patent application PCT/NO2013/050120, it is described how thermal energy storages like those according to the teaching of WO 2012/169900 A1 are beneficial in order to simplify and increase efficiency of energy plants of various types, such as concentrated solar power plants and nuclear power plants.

Some relevant art has been developed by Deutches Zentrum für Luft- and Ramfarth e.V. (DLR), such as described in patent publication DE 10 2009 036 550 A1. However, the thermal energy storages of DLR are rather difficult and expensive to build for a large-scale storage. Furthermore, said storages are not easy to handle and transport, are not particularly feasible for modular stacking and modular thermal storage scale-up or scale-down, have large footprints with respect to storage capacity provided, have large heat loss due to high surface to volume ratio, are not feasible for containing or identifying the exact position of possible leakage of heat transfer fluid, and are not feasible for easy repair or replacement or bypass/isolation of modular or smaller parts of the storage.

Despite recent significant steps forward, provided by the technology described above, it is still a demand for improvements. The effect/cost ratio is always in demand for improvement, as well as the versatility and flexibility of the thermal energy storage with respect to sources of energy.

The objective of the present invention is to meet growing needs and demands with new technology, providing improvement with respect to one or several of the issues mentioned above.

SUMMARY OF THE INVENTION

The invention provides a method for building a high temperature thermal energy storage. The method is distinctive in that it comprises the steps:

to build a thermally insulated foundation for the storage, to build at least one self-supported cassette, which cassette is a self-supporting frame or structure containing a number of concrete thermal energy storage elements, by building said frame or structure and a number of individual concrete thermal energy storage elements, some or all of said elements comprising embedded heat exchangers, and arranging said elements in said frame or structure, to arrange and/or build the at least one cassette on said foundation, to build and operatively connect a pipe system, the pipe system comprising an inlet and an outlet for thermal input to and output from the storage, respectively, and connections to the heat exchangers for circulating fluid through said heat exchangers for thermal energy input to or output from said thermal energy storage elements, and to arrange thermal insulation around and on top of the self-supporting cassettes containing concrete thermal energy storage elements.

The method preferably comprises one or more of the following steps, in any operative combination:

to stack a number of cassettes vertically on the foundation, building one or several stacks of cassettes arranged as one or several rows of stacks;

to arrange the stack or stacks of cassettes so that the concrete thermal energy storage elements are horizontally orientated;

to connect the vertical cassettes in series via pipes that connect to the heat exchangers in the cassettes, to arrange the pipe system on one side of the cassette or stack of cassettes;

to arrange the pipe system so that several stacks of cassettes are coupled in parallel;

to arrange the pipe system and cassettes or stacks of cassettes in blocks, so that each block can be isolated from the rest of the storage by operating valves of the pipe system;

to stack and arrange cassettes packed so that a ratio of the outer surface area to volume is minimized, achieving a closely packed volume of the storage with small footprint, arranging the cassettes so that the concrete thermal energy storage elements are horizontally orientated and the pipe system is arranged on one or more of the sides of the storage, to build elongated concrete thermal energy storage elements and elongated cassette frames, and orientating the elements and cassette horizontally when arranging the cassettes with elements in the storage, to arrange the pipe system for thermal energy input and output so that the inlet and the outlet to the storage can be changed reversibly and so that at least one inlet or outlet is arranged at a high elevation of the storage and at least one inlet or outlet is arranged at a low elevation of the storage, and arranging the connections and/or valves to the heat exchangers of the thermal energy elements so that fluid can be circulated through said heat exchangers gradually or stepwise upwards, downwards and/or horizontally sideways;

to arrange the cassettes in stacks or blocks with several stacks of cassettes, so that the pipe system is arranged only on one side of said stack or block of elements, preferably facing a wall of the storage, to arrange cassettes with concrete thermal storage elements vertically standing on the foundation, which is particularly feasible with gas as heat transfer fluid, and preferably including the step to build said cassettes with said elements as vertically standing on the foundation, to arrange self-supporting cassettes or structure with coupling parts for roof and/or wall elements, and thermally insulated roof and/or wall elements comprising coupling parts matching the cassette or structure coupling parts, arranging and coupling said elements as thermally insulated roof and walls, respectively, to arrange the concrete thermal energy storage elements in stacks within a frame comprising two opposing sidewalls and floor but no roof, the elements resting on elements below as contained horizontally orientated within the sidewalls, thereby providing cassettes that are open upwards but easily can be stacked on top of each other, to arrange the elements in stacks, with inlays, supports, shims or similar objects between the elements, at regular or irregular positions along the length of the elements, providing a distance between the elements, said inlays, supports, shims or similar objects between the elements comprising coupling parts providing a self-supporting cassette structure as stacked and coupled, to arrange the elements in stacks, with support system parts between the elements, the support system parts comprising coupling parts and are arranged at regular or irregular positions along the length of the elements, providing a distance between the elements, the support system parts as coupled provides a self-supporting structure including openings for elements, the openings having hexagonal shape, square shape, rectangular shape, round shape, elliptical shape, triangular shape or other shape into which the elements fit.

to arrange the elements in stacks, with support system layers between the elements, the support system layers comprising coupling parts at regular or irregular positions along the length of the elements, providing a distance between the elements, the support system layers as coupled provides a self-supporting structure including the support system layers as assembled or coupled and stacked, providing a support system with openings for elements, the openings having hexagonal shape, square shape, rectangular shape, round shape, elliptical shape, triangular shape or other shape into which the elements fit, to fill an active heat transfer and storage medium in the form of a phase change material, in the volume between the elements and a storage housing, or to fill an active heat transfer and storage medium in the form of a stagnant liquid, in the volume between the elements and a storage housing, or to fill an active heat transfer and storage medium in the form of a dynamic fluid, in the volume between the elements and a storage housing, so that the dynamic fluid can flow between the elements and cassettes from an inlet to the housing to an outlet from the housing.

The high temperature thermal energy storage of the invention can comprise parts or blocks of different design, therefore any combination of features as specified above are possible.

More specifically, the step to build at least one self-supported cassette preferably comprises the steps:

to build a frame, to arrange outer metal shells of thermal energy storage elements in the frame, the outer metal shells of the thermal energy storage elements being a combined casting form, reinforcement and containment of fluid for thermal energy input or output if fluid leakage occur;

to arrange heat exchangers and optional electric heaters into said metal shells;

with said outer metal shells oriented in a vertically standing position and with an open upper end, to fill grout or concrete mixture up to a prescribed level at which level the ends or connections of said heat exchangers and optional heaters extend up over the top of the elements as standing vertical, and optionally arranging a metal shell lid over the open end, with said ends or connections brought through said lid;

to cure the grout or concrete, and to handle and transport the cassette, placing the cassette at its intended position and orientation in the storage, whereby the frame is used not only as a fixture for casting and curing the concrete thermal energy storage elements, and a structure for facilitating handling and transport of said elements, but also as a self-supporting structure for the storage itself and the stacks of cassettes in the storage.

Alternatively, the concrete thermal energy elements are built separately and assembled in cassettes, by the steps above, using another frame or fixture to hold element outer metal shells vertical when casting. The cassettes and cassette parts without concrete, which are the frame, the outer metal shells and the heat exchanger(s), as assembled or separate, preferably has size and weight feasible for handling by a normal building site crane and transport in a typical container. Said cassette parts are preferably prefabricated and tested in a workshop. Only during the casting step said outer metal shells with open upper end, with heat exchangers inside and preferably as closely arranged n said frame, must be arranged in a vertical position, near vertical or inclined position to facilitate casting. After casting, the cassettes are preferably still possible to transport, by a heavy lift crane on the building site or elsewhere by a lighter crane, by truck and by rail.

The invention also provides a high temperature thermal energy storage, distinctive in that the storage comprises:

a thermally insulated foundation, at least one self-supported cassette arranged on said foundation, which cassette is a self-supporting frame or structure containing a number of concrete thermal energy storage elements, some or all of said elements comprising embedded heat exchangers, a pipe system, the pipe system comprising an inlet and an outlet for thermal input to and output from the storage, respectively, and connections to said heat exchangers for circulating fluid through said heat exchangers for thermal energy input to or output from said thermal energy storage elements, and thermal insulation around and on top of the at least one self-supported cassette with concrete thermal storage elements.

The storage of the invention preferably comprises one or more of the following features, in any operative combination:
- one or several vertical stacks of cassettes;
- stacks of cassettes arranged so that the concrete thermal energy storage elements are horizontally orientated;
- a pipe system on one side of the cassette or stack of cassettes;
- a pipe system arranged so that several stacks of cassettes are coupled in parallel;
- a pipe system and cassettes or stacks of cassettes arranged in blocks, so that each block can be isolated or bypassed, one after one or stepwise, from the rest of the storage by operating valves of the pipe system,
- a pipe system arranged so that individual thermal elements and individual cassettes can be isolated or bypassed, one after one or stepwise, from the rest of the storage, by operating valves of the pipe system,
- a stack or stacks of cassettes closely stacked and arranged so that a ratio of the storage outer surface area to volume is minimized, achieving a small footprint and heat loss of the storage,
- cassettes arranged so that the concrete thermal energy storage elements are horizontally orientated and with the pipe system arranged on one or more of the sides of the storage, preferably only on one side or two sides,
- cassettes with concrete thermal storage elements arranged vertically standing on the foundation, which is particularly feasible with gas as heat transfer fluid.

The storage preferably comprises thermal energy storage elements comprising
- an outer metal shell,
- an embedded tube heat exchanger,
- hardened concrete or grout inside the shell with ends or connections of heat exchangers extending out from the concrete,
- wherein the outer shell is a combined casting form, reinforcement and containment of fluid for thermal energy input or output in case of embedded heat exchanger leakage.

The outer metal shell preferably is the only reinforcement for the concrete. The outer metal shell also increases the maximum acceptable temperature and temperature range for the storage, since durability is improved thereby, compared to concrete storage elements without outer metal shell.

Preferably, the storage comprises a pipe system for thermal energy input and output arranged so that the inlet and the outlet to the storage can be changed reversibly and so that at least one inlet or outlet is arranged at a high elevation of the storage and at least one inlet or outlet is arranged at a low elevation of the storage, and with connections or valves to individual or groups of the heat exchangers of the thermal energy elements arranged so that fluid can be circulated through said heat exchangers gradually or stepwise upwards or downwards. The terms inlet and outlet mean a pipe coupling or connector, or a valve, a welded coupling, an opening, or similar, having the intended functionality according to the context.

In a preferable embodiment, the storage comprises a stack of self-supported cassettes, the cassettes comprising a frame open in at least one end, containing closely packed concrete thermal energy storage elements with outer metal shell and heat exchangers embedded in the concrete, said elements arranged in horizontal orientation in vertical stacks of cassettes, wherein the frame is not only a fixture for casting and curing of said elements, and a structure for facilitating handling and transport, but also as a structure for the storage itself and the stacks of cassettes in the storage.

The storage preferably comprises self-supporting cassette frames or structure with coupling parts for roof and/or wall elements, and thermally insulated roof and/or wall elements comprising coupling parts matching the cassette frame or structure coupling parts, arranged and coupled as thermally insulated roof and walls, respectively. This embodiment is particularly feasible for small and medium sized storages.

The invention also provides a method of operating a high temperature thermal energy storage according to the invention. The method is distinctive in that it comprises the steps:
- to circulate warmer than the storage heat transfer fluid, for thermal energy input to the storage, stepwise or gradually from a higher elevation to a lower elevation in the storage, by operating the pipe system accordingly, and
- to circulate colder than the storage heat transfer fluid, for thermal energy output from the storage, stepwise or gradually from a lower elevation to a higher elevation in the storage, by operating the pipe system accordingly.

In a preferable embodiment of said method of operating the storage contains a phase change material in the volume between the concrete thermal energy storage elements and the housing, and water is circulated through heat exchangers embedded in said elements when thermal energy is taken out from the storage, whereby the storage is operated at conditions so that the phase change material solidifies whilst the water evaporates, thereby using the heat of solidification of the phase change material as heat of evaporation for the water. Feasible phase change material is commercially available.

A further preferable embodiment of said method of operating the storage, is for operating the storage with a thermal oil or other single-phase liquid as heat transfer fluid, whereby
- the circulation for thermal energy input to the storage, is via an inlet at a highest elevation of the storage, directing the warmer fluid to the uppermost elements or elements at an elevation with temperature lower than the warmer fluid; and
- the circulation for thermal energy output from the storage, is via an inlet at a lowest elevation of the storage, directing the colder fluid to the lowermost elements or elements at an elevation with temperature higher than the colder fluid,
- whereby said circulation is by pumping with a pump when a thermal oil or other one-phase liquid is the circulated heat transfer fluid.

The invention also provides a method of operating a high temperature thermal energy storage invention with water/steam, LPG or other two-phase liquid-gas mixture as heat transfer fluid, with concrete thermal energy storage elements oriented horizontally and with a separator connected at a high elevation and connected with one or more pipes externally to the inlet pipe(s) at a low elevation, enabling natural circulation by gravity without the use of a pump the storage acting as a condenser when the storage is charging and a boiler when the storage is discharging thermal energy. The method is distinguished by the:
- to add steam or other gas via an inlet at a lowest elevation of the storage, whereby the gas is added to the liquid either through a pipe or generated via electrical resistors inside the pipe, when charging thermal energy,
- to add water or other liquid via an inlet at the highest elevation of the storage, whereby water or other liquid is added to a gas/liquid separator such as a steam drum, alternatively the water or other liquid is added at the lowest elevation of the storage,
whereby liquid flow downwards in the external pipe and gas flow upwards in the storage.

With water/steam as heat transfer fluid, with evaporation and condensation, with vertically rising tubing, as implicit from the above, natural circulation allows operation without a pump, which is a feature not known from any prior art thermal energy storage.

Each of the methods and the high temperature thermal energy storage of the invention improves the stored or cycled thermal energy/cost ratio, reduces the capital cost for thermal energy storages, lowers the risk with respect to health, fire and pollution related to fluid leakages, reduces the relative heat losses and provides a thermal energy storage more feasible for high temperature service than other storages, at reduced cost and footprint compared to stored energy. High temperature means 100-1500° C., more preferably 100-700° C. even more preferably 100-570° C. or 150-570° or 200-570° C. For general operation, but particularly for high temperature operation, the high temperature thermal energy storage of the invention is beneficial with respect to all or most of the issues mentioned above, compared to prior art thermal energy storages.

The term stack means in the context of the invention a number of thermal energy storage elements or cassettes arranged one on top of another, vertically aligned or not. Accordingly, a stack extends upwards, and the method of arranging or building a stack involves the verb to stack. The concrete thermal elements of a cassette, and accordingly also the embedded heat exchangers, as well as the cassettes, are preferably elongated and oriented horizontally as arranged in the stack. Steps of the methods are not necessarily executed in the order as set forth in the independent claims, as long as the methods are operable the order of the steps are interchangeable and steps can be combined. The term high temperature as used in the methods of the invention and for the storage of the invention means that the methods and storage are suitable for high temperature operation, such as 200-570° C. as mentioned above and further described below, but also operation at very large dynamic temperature ranges and also operation at very low temperatures.

The number of cassettes and concrete thermal energy storage elements in a storage of the invention can vary broadly, and one distinctive feature is how easy the storage is to scale up or down, by adding or taking out cassettes, being of a size and weight possible to handle with a crane. The number of cassettes in a storage can be 1, 2, 5, 10, 40, 100, 200 or 500 and above, and any integer in between. The number of concrete thermal energy elements in each cassette in a storage of the invention can be 1, 2, 5, 10, 40, 100, 200 or 500 and above, and any integer in between. All cassettes in a storage are preferably but not necessarily identical. Accordingly, said number can range from less than 10 to several 10's of thousands or more, depending on the size of each element, the number of elements in a cassette and its respective energy storage capacity, the total number of cassettes and thus the desired energy storage capacity of the whole storage system. As an example, an element with 12 meters length and 250 mm diameter may be able to store 25-50 kWh of thermal energy or more, and so a thermal energy storage (TES) with 50 MWh capacity would require 1000-2000 of such elements. Likewise, installation, maintenance, repair and replacement is relatively easy for a storage of the invention, by installing, taking out or setting in elements and/or cassettes with a crane. The elements can be arranged in a fixture or template or with intermediate elements for stacking, or the elements can be arranged closely stacked or packed, dependent on the requested performance and integration in existing power plants or systems and available sources for energy. Different embodiments have different advantages. However, there are two main groups of embodiments, namely with or without an active heat transfer and storage fluid in the volume inside the storage, between the elements and inside the housing. Said active heat transfer and storage fluid is either stagnant or dynamic. Said stagnant fluids are liquids, such as a thermal oil, molten salt or molten metal, or a liquid-solid phase change material (PCM). Said dynamic fluids are gases or liquids. A close packing or near close packing of cassettes and elements can be feasible for storages of the invention containing stagnant heat transfer or storage liquid or PCM. Feasible for cassette and/or element packing allowing flow around the elements, is a dynamic active heat transfer and storage fluid in the volume inside the storage housing, between the elements. This means a fluid flowing through the thermal storage, outside and around the elements but inside the housing, and through or around cassettes, the storage housing having an inlet and an outlet for such fluid. Such active fluid can be hot gases, such as exhaust gas, combusted gas, flue gas or other hot gas, up to temperature acceptable for the outer element shell, if present, and embedded heat exchangers or heaters, such as up to about 1000-1200 or 1500° C. Oils can be used active and melted salts or metals can be used active. The flow of the dynamic active fluid around elements and through or around cassettes in the housing is achieved by gravity or forced flow, or both. Forced flow, or forced convection, is achievable by separate pumping or compressing or by inherent pressure in the fluid as delivered from the source. One or both of increased heat storage capacity and increased heat transfer rate of the storage is provided with said heat transfer and storage fluid inside the housing, between the elements and the housing. Furthermore, with one or more embedded heat exchangers in some or preferably all of the elements, heating and evaporation of circulated water or other feasible fluid through the heat exchanger is facilitated, which is beneficial for connecting the heat exchanger directly to a turbine, such as a steam turbine. For direct evaporation of for example water to steam in the elements, when taking out energy from the storage, the flow of water through the heat exchangers and storage is preferably arranged to be gradually or stepwise upwards, by arranging the water flow gradually or stepwise upwards, from element to element and cassette to cassette. Thereby both the flow in the embedded heat exchangers and separation effect due to gravity act in the desired direction upwards and toward the outlet, which outlet from the heat exchangers preferably is at a high point of the storage while the inlet to the heat exchangers preferably is at a low point of the storage.

DETAILED DESCRIPTION

Figure 1:
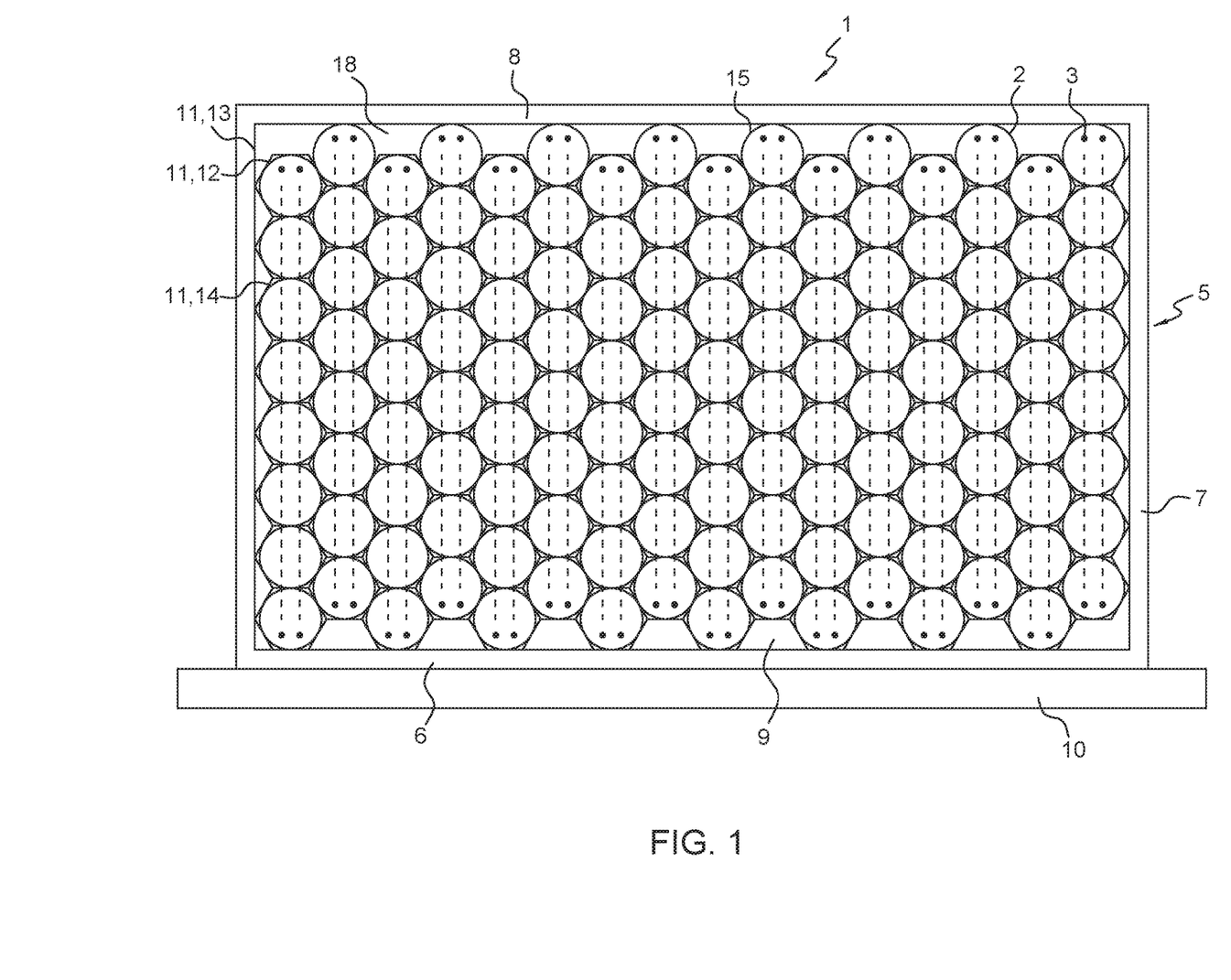
FIG. 1 illustrates a high temperature thermal energy storage of the invention.

Reference is made to FIG. 1, illustrating a high temperature thermal energy storage 1 of the invention, in a mixed view of cross section and end view with the end wall taken away. The storage comprises a number of easily installable and replaceable concrete thermal energy storage elements 2, the elements have been arranged in one stack of elements. The illustrated storage contains 128 elements, illustrated in cross section. The elements 2 have heat exchangers 3, embedded in the concrete, the ends and connections between heat exchangers, extending out from the concrete or outside the concrete, can be seen as black dots 3 in the upper and lower elements in a vertically aligned row of elements, or as vertical black lines 3,4 between vertically aligned elements, the vertical black line illustrating piping connecting elements over and under, respectively. Said vertical lines are alternatively part of a pipe system 4 for thermal energy input and output, comprising an inlet and an outlet for thermal input to and output from the storage, respectively, and arranged with connections to the heat exchangers for circulating fluid through said heat exchangers for thermal energy input or output. The storage comprises a housing 5 into which said elements have been arranged, with a floor 6, also termed a foundation, a fundament or a base, sidewalls 7 and a roof 8. The floor includes concrete fill-ins 9, or similar, for supporting and positioning the lowest row of elements. The housing comprises thermal insulation 10, in the illustrated embodiment integrated in the housing floor, sidewalls and roof and not illustrated specifically. Alternatively, the insulation can be inside or outside the walls, floor and roof of the housing as distinct layers of insulation.

The illustrated storage comprises a support system 11, allowing a large number of thermal elements 2 to be stacked whilst still allowing operation at high temperature. The illustrated support system 11 comprises a honeycomb support structure 12 and a support steel frame 13. The honeycomb support structure consists of honeycomb support layers 14, arranged layer by layer, "valley over hill". The honeycomb layers provide a self-supporting structure, in addition to preferably being supported also by the support frame toward the sidewalls and the floor below. Neighboring columns of elements are vertically staggered, as illustrated, allowing a simplified pipe system. The support system must be dimensioned to provide structural strength over the operating conditions and life of the storage, allowing thermal expansion of the elements at a sufficient degree to avoid cracking of the elements. The support system as assembled, more precisely the self-supporting structure, containing concrete thermal energy storage elements containing embedded heat exchangers, is in this context termed a cassette. In FIG. 1, an active heat transfer and storage medium in the form of a phase change material 18, in the volume between the elements and housing, is illustrated. Active heat transfer fluids and related features and steps are preferably as explained in patent application NO 20141540 and patent family members, to which application reference is made and the teaching of which application hereby is incorporated by reference.

Figure 2:
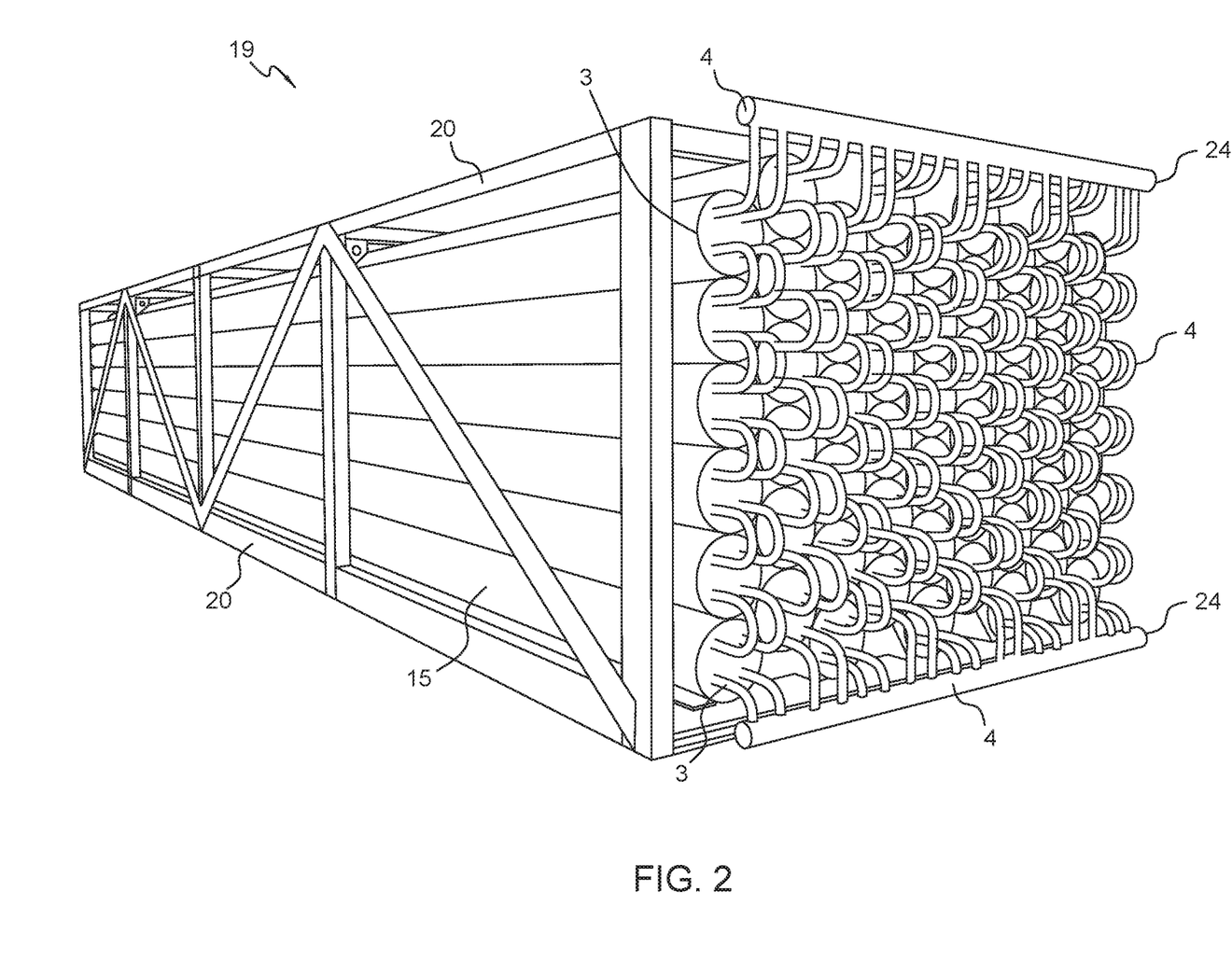
FIG. 2 illustrates a cassette for a storage of the invention.

FIG. 2 illustrates a cassette 19 preferable for a storage of the invention. The cassette comprises a frame 20 and 9 by 6 columns of concrete thermal energy storage elements 2. The concrete thermal energy storage elements comprises an outer metal shell 15, closed in one end and open in the other end, and embedded tube heat exchangers 3 with ends 4 extending out from the concrete. Said ends can alternatively be considered part of a pipe system 4, and it may, include valves or other means for bypassing or isolating elements. Preferably, the heat exchangers and ends, including a header or manifold at a high level and a low level with said elements as horizontally oriented, are welded and formed as one piece covering all elements in a cassette. When casting concrete in the cassette, the elongated frame 20 is arranged in vertical position with upwards open elongated metal shells 15 with heat exchangers 3 inside, concrete or grout is filled up until only the ends 4 of the heat exchangers extend up over the steel shells and concrete. Said concrete 24 is the white area between said ends 3 and said outer metal shells 15. Then the concrete is cured, typically over several days, the cassette is then flipped down to horizontal orientation, as illustrated, and arranged in intended position and orientation in a storage of the invention. The illustrated heat exchangers comprises embedded parts of U-shaped pipe or tubes, extending almost to the other end of the outer shells, which other ends are closed. Alternatively or additionally, the heat exchangers are built as one small tube inside a larger tube, the larger tube is closed in the embedded end that reaches further into the concrete than an open inner pipe. Typical dimensions of concrete thermal energy storage elements are outer diameter OD 200 to 500 mm and length 3 000 to 12 000 mm. Most preferably, the heat exchanger is a U-shaped small diameter tube dimensioned to provide turbulent flow of the heat transfer fluid at normal operating conditions. For a small diameter tube heat exchanger, this means that $R>4000$, more preferably $Re>5000$, where Re is the Reynold's number. To this end, the tubes must, have relatively small internal diameter compared to the flow rate, hence the term small diameter tube. Examples on typical small tube outer diameters are 10 mm, 15 mm, 20 mm, 25 mm, 30 mm, 35 mm, 40 mm, 45 mm, 50 mm or up to 60 mm, or any diameter in between, for example 26.7 mm corresponding to Diameter Nominal (ON) 20. The concrete thermal energy storage elements, including the heat exchangers, are preferably according to the teaching of patent application PCT/NO2014/050250 also published as U.S. Patent Application Publication No. 2016/0320145, to which reference is made and the teaching of which hereby is incorporated by reference. The illustrated frame has dimensions to contain 6×9 closely stacked such elements. Alternatively, the concrete thermal energy storage elements are larger or smaller in diameter, in the form of one or several elements, with or without outer metal shell, but inside a frame allowing easy production, handling and stacking, without undue cracking or unduly limiting the maximum temperature or the feasible temperature range for operation without undue crack formation. Cassettes with 4×5, 5×7, 7×9 or other combinations are feasible.

In a preferable embodiment of the invention, an outer metal shell of the concrete thermal energy storage element and a cassette frame are combined as one structure functioning as a form for casting of concrete, armoring for the concrete, heat transfer fluid leakage catcher and the self-supporting modular cassette structure in a thermal energy storage of the invention. Said combined structure can be combined with a single structure heat exchanger for one cassette, preferably preassembled and tested, for example as illustrated on FIG. 2, this may represent the most preferable embodiment for a thermal energy storage of the invention with cassettes and/or storage, of small to medium size. Said combined outer shell/frame cassette can be feasible for cassette/element cross section diameters up to about 10 $m^2$ and number of embedded U-shaped pipe bends up to about 100 and temperatures up to about 570° C. Small to medium sized cassettes means in this context cassette cross section area up to about 10 m². Preferably, the combined frame/outer metal, shell comprises guideposts on top and funnels at the bottom, or similar structure for easy stacking, lifting eyes and coupling parts for attaching adapted insulated modular wall and roof elements.

Figure 3:
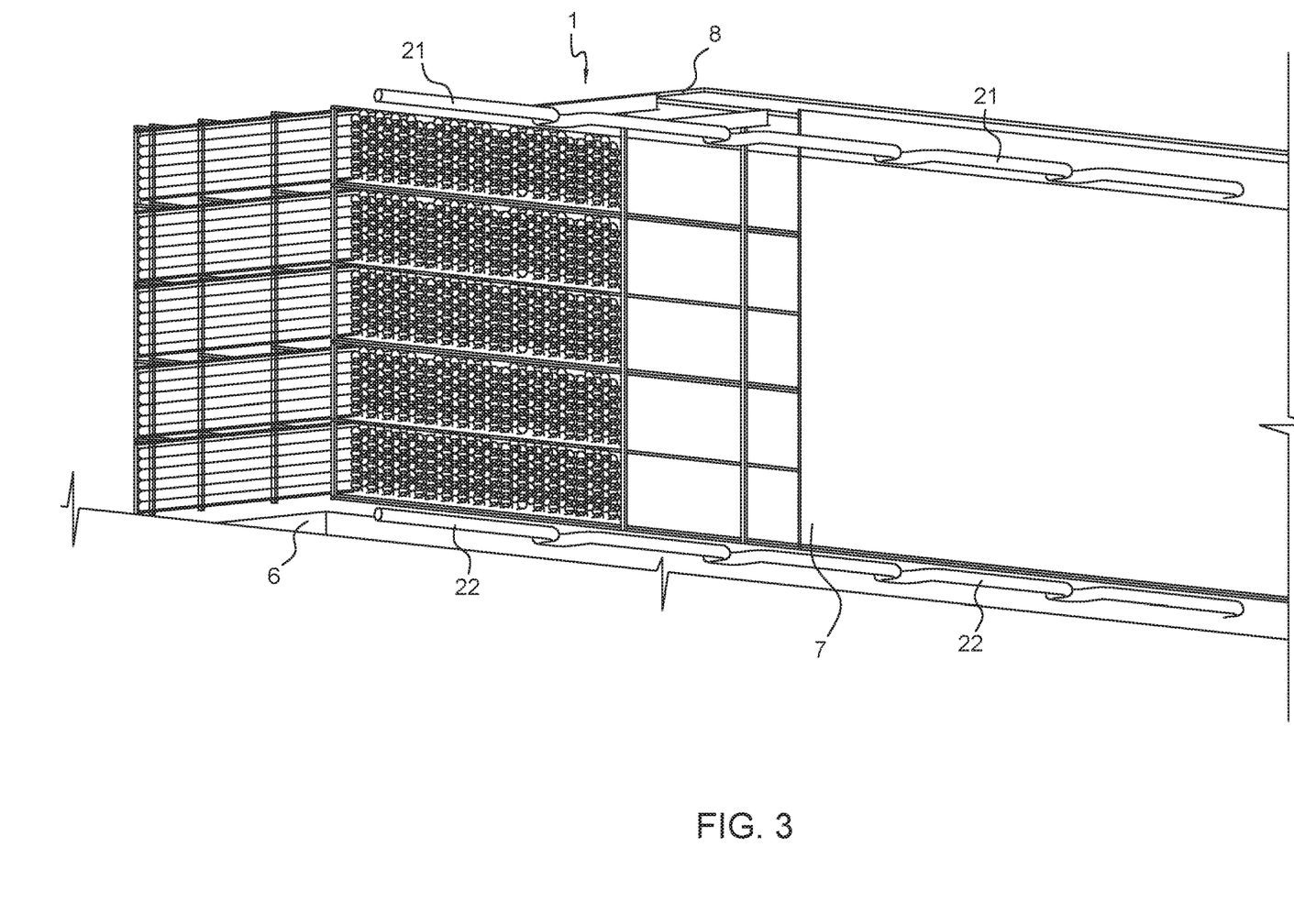
FIG. 3 illustrates a high temperature thermal energy storage of the invention.

However, concrete thermal energy storage elements with large diameter or cross section area, particularly with an outer metal shell, the outer shell combined or not with the cassette frame, may have several disadvantages in practice. Firstly, the period for curing and drying for high temperature service may become excessively long. Secondly, the risk of cracking and other quality problems increases. Thirdly, the outer shell/self-supporting frame must be excessively solid/strong with increasing size. Fourthly, and probably most important, given a similar configuration of the embedded heat exchanger piping, the temperature distribution in a large element or cassette becomes uniform, where the energy (energy that is available to be used) is reduced which actually reduces the efficiency compared to the standard concrete thermal energy element design with about 250 mm diameter round elements or similar. This relates to period/frequency of loading/unloading of thermal energy, temperature difference between hot-cold fluid and concrete, which influence dynamic response and specific storage efficiency, such as cost per stored or cycled energy unit, FIG. 3 illustrates an embodiment of a high temperature thermal energy storage 1 of the invention. The illustrated storage is a large storage, comprising many cassettes 19, in stacks with five cassettes, arranged as a row of stacks on a foundation 6. The illustrated storage comprises a separate roof structure 8 and separate wall structures 7, both structures thermally insulated. For the wall structure 7 facing the pipe system and heat exchanger ends, a short gap and a fluid barrier between the pipe structure and thermal insulation 10 allows any heat transfer fluid leaking out to flow downward (if liquid) or upwards (if vapor) without soaking the insulation, thereby reducing the risk of fire in case of thermal oil or other flammable heat transfer fluid. Each cassette comprises two manifolds, one at a high position and one at a low positon with elongated frame and concrete thermal energy storage elements inside orientated horizontally, as illustrated. The stacks are typically coupled in parallel, and arranged side by side as blocks stacks, each block with an assembled group of stacks comprises a main manifold 21 at a high elevation and a main manifold 22 at a low elevation. Each block can be thermally insulated from other blocks or groups of blocks, enabling isolation of individual blocks, cooling down, drainage of heat transfer fluid, inspection and maintenance, without affecting the remaining blocks of the storage. Said functionality significantly increases the availability of the storage system.

Figure 4:
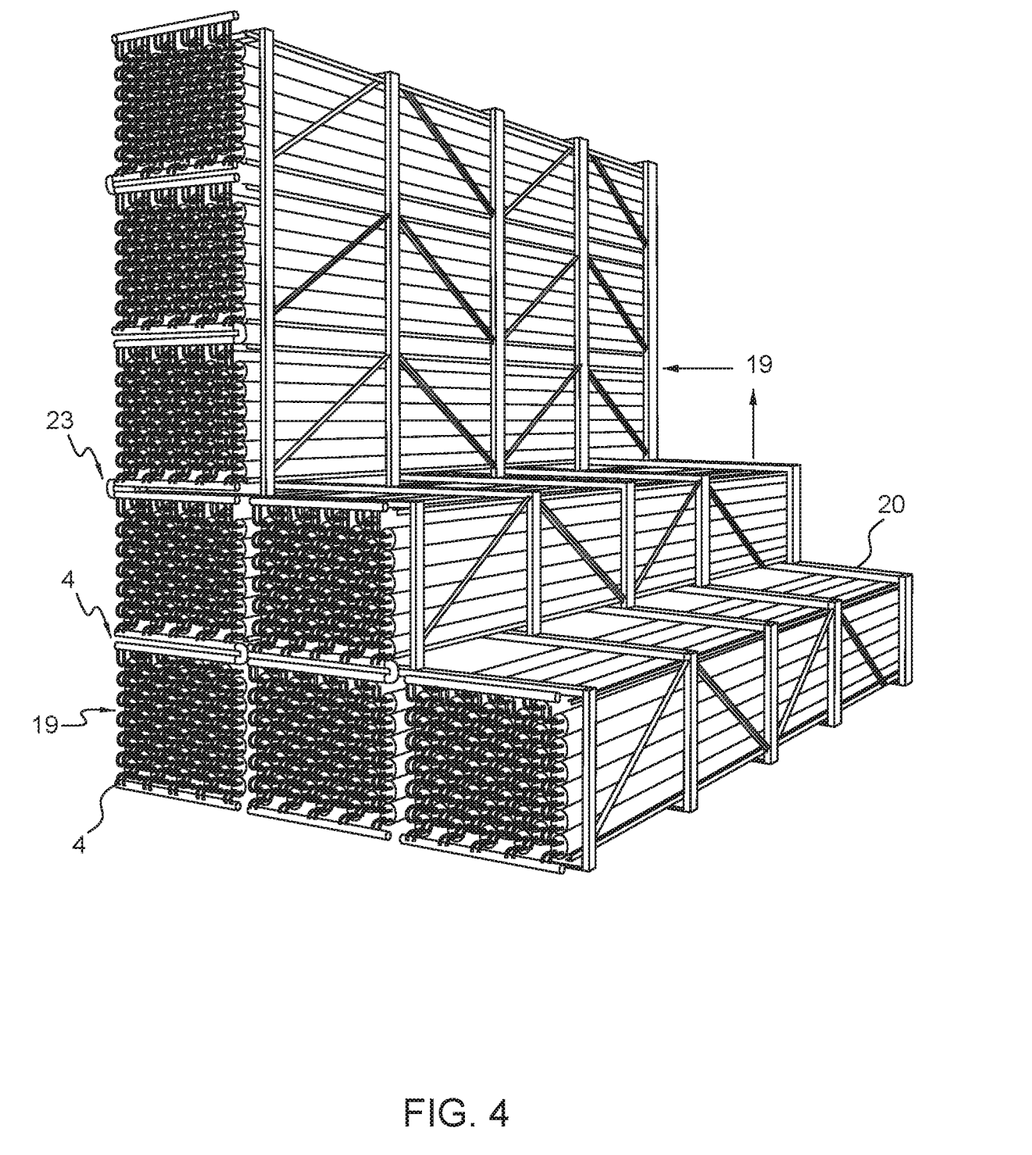
FIG. 4 illustrates details of a high temperature thermal energy storage of the invention.

FIG. 4 illustrates some details of the high temperature thermal energy storage of the invention illustrated on FIG. 3, more specifically how cassettes 19 and pipe systems are arranged. Each cassette comprises two manifolds 4, one at high elevation and one at low elevation. The manifolds are coupled in series in each stack, by u-bends 23.

For clarity, only some of identical or similar features are provided with numerical references in the figures.

The self-supporting structure in a storage of the invention, facilitate building and reduced cost compared to prior art storages, irrespective of the self-supporting structure comprises a honeycomb support structure or similar assembled while building it, for example as illustrated in FIG. 1, or a modular structure comprising several cassettes, for example as illustrated in FIG. 3. The cassettes and parts thereof are preferably prefabricated and tested, and then transported and installed easily, as they are preferably not made too large and heavy. The cassette frames preferably provide a truss-type structure per se and as stacked. The cassette frame provides structural strength for stacking and also a strong structure for handling and transport, irrespective of the concrete thermal energy storage elements comprises an outer metal casing or similar, or not. However, the concrete thermal energy storage elements preferably comprises an outer metal shell or casing, since this facilitates production, handling, safety and efficiency as discussed. In addition, an outer metal shell or casing also improves durability, increases the maximum operating temperature and the operating temperature range, particularly if the outer metal shell or casing is round in cross section shape. Furthermore, the arrangement of having embedded heat exchangers with inlet and outlet in the concrete thermal energy storage elements on only one side of cassettes, stacks, rows or blocks of cassettes have not only practical advantages, but also provides better stress/strain distribution, since only a radial stress/strain gradient is significant, which improves efficiency, response and durability over other designs, such as those provided by DLR.

Figure 5:
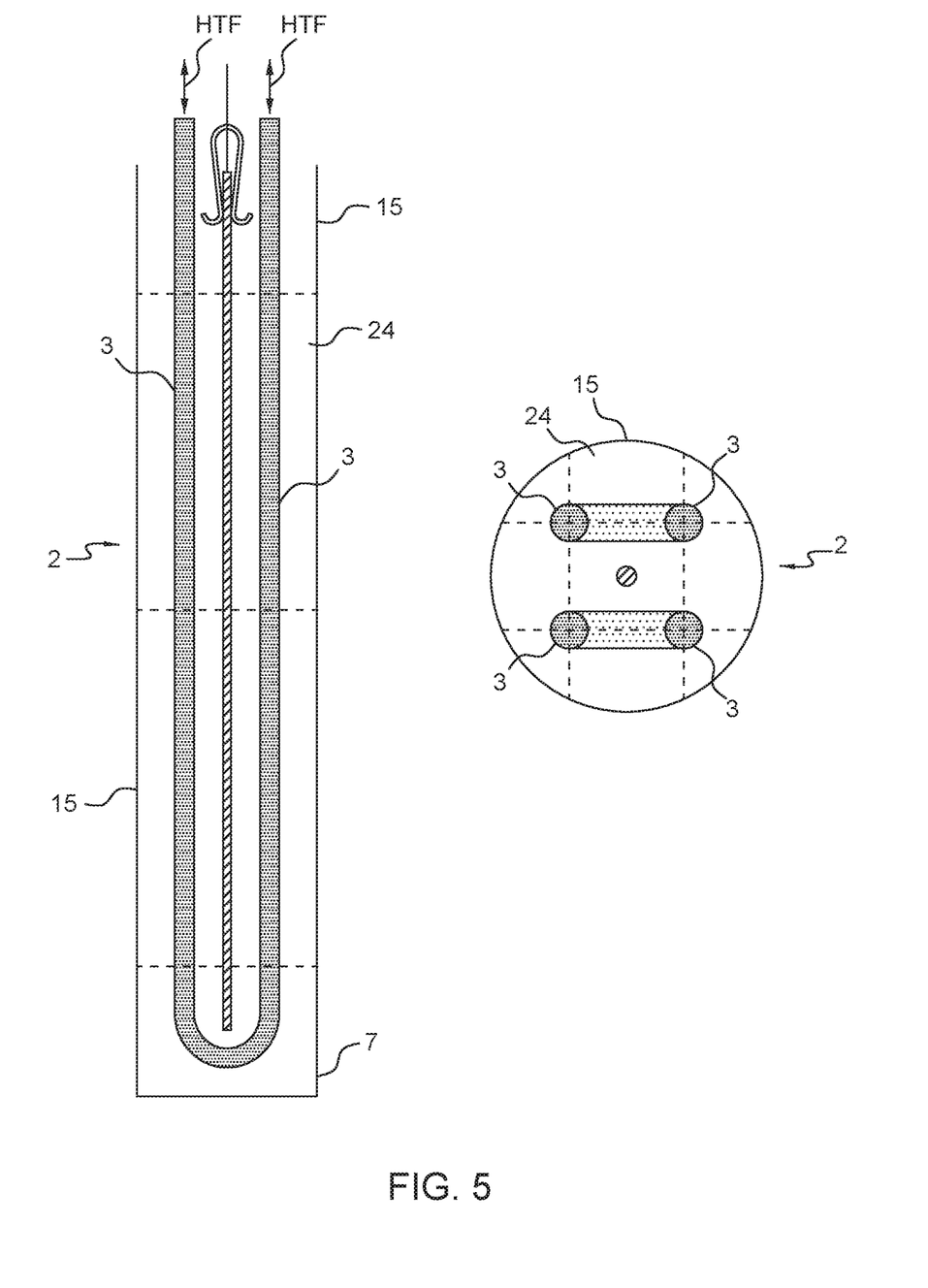
FIG. 5 illustrates an element of the invention.

FIG. 5 illustrates a double U-bend element of the invention, in longitudinal section and cross section.

Figure 6:
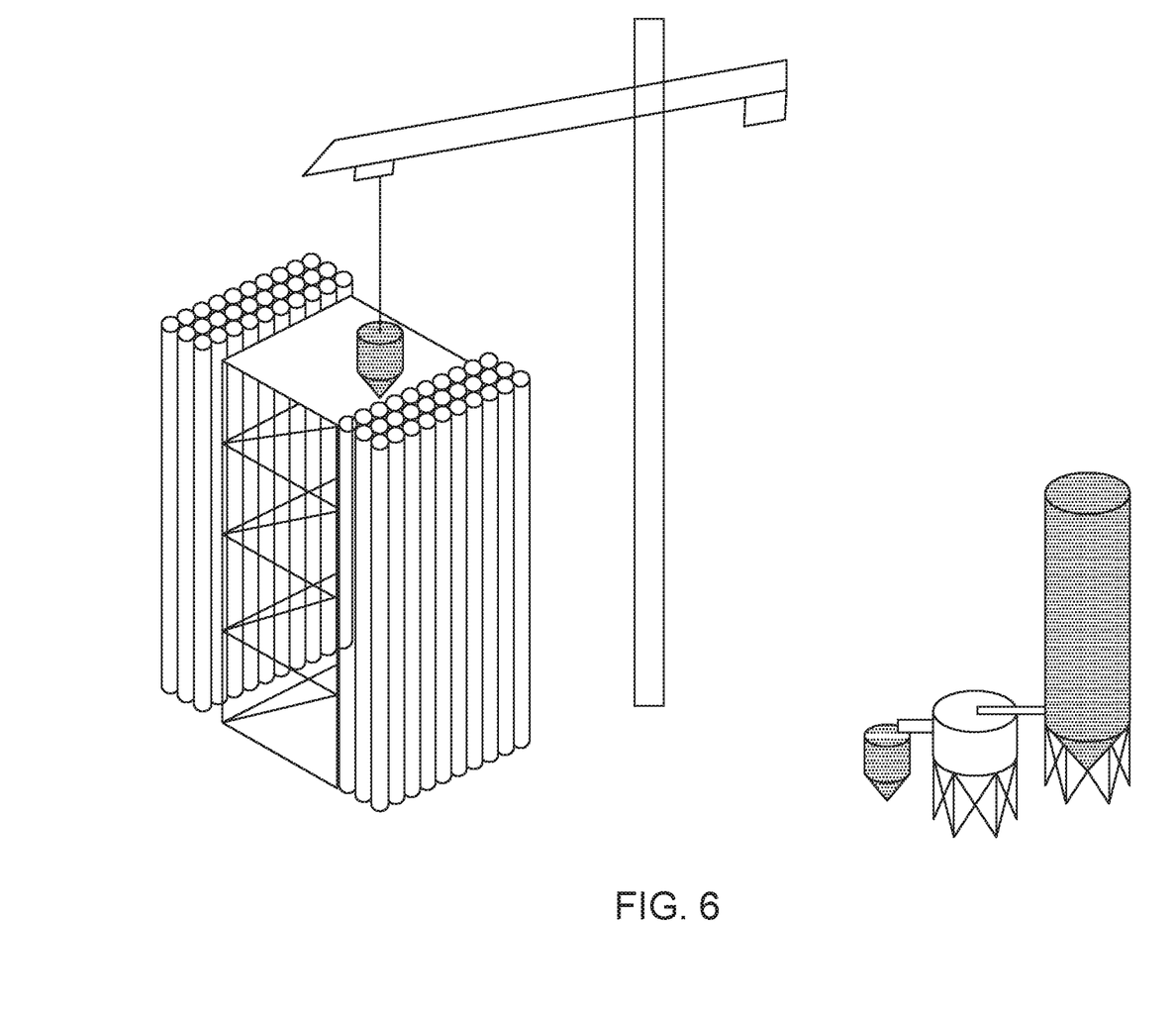
FIG. 6 illustrates one possible way of performing the casting process of the invention.

FIG. 6 illustrates a method of the invention for building an element of the invention. More specifically, the casting step is illustrated, whereby the outer metal shell, into which the means for heat input and output have been arranged correctly (not illustrated specifically), is filled with grouting or concrete up to a prescribed level.

The figures illustrate only some of numerous embodiments of the storage, features therein, and methods of the invention. For small storages, or storages with small stacks of elements, the elements can be self-supporting, particularly if they comprise an outer metal shell being a combined casting form and reinforcement. Elements with hexagonal, quadratic or rectangular cross section shape are most feasible for stacking of self-supporting cassettes and elements as combined, quadratic elements can be rotated 45 around the longitudinal axis to provide a position adjusting wedge shape upwards, facilitating building the storage. More comprehensive and solid support systems are required for larger storages and for higher operating temperatures.

Parts that are to be coupled, preferably comprises coupling parts such as guide posts/cones and guide pins/posts, or similar male-female coupling parts.

The term "high temperature" in the context of the invention do not mean that the storage must be used for high temperature, but preferably is used for high temperature operation, which in this context is from 100° C. up to 570° C. for storages with exposed element steel shells and pipe systems, and up to 1000-1200° C. or even 1500° C. for storages with elements without steel shells or exposed steel pipe system parts, the otherwise exposed metal parts preferably being insulated or made of high temperature resistant alloys or material. The storage of the invention can operate at very high dynamic temperature range, including large temperature differences between fluid and elements, compared to prior art storages.

The high temperature thermal energy storage of the invention can include any feature as here described or illustrated, in any operative combination, each such operative combination is an embodiment of the invention. The method of building a high temperature thermal energy storage of the invention can include any feature or step as here described or illustrated, in any operative combination, each such operative combination is an embodiment of the invention. The methods of operating a high temperature thermal energy storage of the invention can include any feature or step as here described or illustrated, in any operative combination, each such operative combination is an embodiment of the invention.

The invention claimed is:

1. A method for building a high temperature thermal energy storage, the method comprising:
   building a thermally insulated foundation for the high temperature thermal energy storage,
   building at least one cassette, wherein the at least one cassette comprises a frame;
   building a plurality of individual concrete thermal energy storage elements;
   wherein some or all of the concrete thermal energy storage elements comprise pipe heat exchangers embedded in the concrete of the concrete thermal energy storage elements for the full distance between a pipe heat exchanger inlet and a pipe heat exchanger outlet, wherein ends of the pipe heat exchangers extend out from the concrete in only one end of the concrete thermal energy storage elements to arrange the plurality of concrete thermal energy storage elements in the frame;
   wherein the at least one cassette, with the plurality of concrete thermal energy storage elements contained in the frame, is a self-supporting structure for transport and installation as one unit;
   arranging the at least one cassette with said plurality of concrete thermal energy storage elements contained in the frame on the foundation;
   building and operatively connecting a pipe system, the pipe system comprising an inlet and an outlet for thermal input to and output from the high temperature thermal energy storage, respectively, and connections to the heat exchangers for circulating fluid through the heat exchangers for thermal energy input to or output from the plurality of concrete thermal energy storage elements; and
   arranging thermal insulation around and on top of the at least one self-supported cassette containing the plurality of concrete thermal energy storage elements.

2. The method according to claim 1, comprising at least one of the following steps:
   vertically stacking the cassettes on the foundation;
   building one or several stacks of cassettes arranged as one or several rows of stacks;
   arranging the stack or stacks of cassettes so that the concrete thermal energy storage elements are horizontally oriented;
   arranging the cassettes vertically standing on the foundation;
   arranging the pipe system on one side of the cassette or stack of cassettes;
   connecting the vertical cassettes in series via pipes that connect to the heat exchangers in the cassettes;
   arranging the pipe system so that several stacks of cassettes are coupled in parallel;
   arranging the pipe system and cassettes or stacks of cassettes in blocks, so that each block can be isolated from the rest of the storage by operating the pipe system;
   closely stacking and arranging the cassettes;
   arranging the cassettes so that the concrete thermal energy storage elements are horizontally oriented and the pipe system is arranged on one side of the cassettes in a row of cassettes facing one side of the high temperature thermal energy storage,
   combining an outer metal shell of the concrete thermal energy storage element and the cassette frame as one structure functioning as a form for casting of concrete, armoring for the concrete, heat transfer fluid leakage catcher and the self-supporting modular cassette structure; and
   arranging a heat exchanger for one cassette or one concrete thermal energy storage element as one structure.

3. The method according to claim 1, wherein the step of building at least one self-supported cassette comprises the steps:
   building a frame;
   arranging outer metal shells of thermal energy storage elements in the frame, wherein the outer metal shells are closed in one end and open in an opposite end;
   wherein the outer metal shells of the thermal energy storage elements being a combined casting form, reinforcement and containment of fluid for thermal energy input or output if fluid leakage occurs;
   arranging the pipe heat exchangers into the outer metal shells;
   wherein the outer metal shells are oriented in a vertically standing position with open upper ends and closed lower ends, to fill grout or concrete mixture up to a prescribed level at which level the ends or connections of the heat exchangers extend up over the top of the elements as standing vertical, wherein the ends or connections of the heat exchangers extend out from the grout or concrete in only one end of the metal shells to cure the grout or concrete, wherein the concrete fills the full volume between the outer metal shell and the pipe heat exchangers; and
   handling and transporting the cassette and placing the cassette at intended position and orientation in the high temperature thermal energy storage; and
   wherein the frame is used not only as a fixture for casting and curing the concrete thermal energy storage elements, and a structure for facilitating handling and transport of the elements, but also as a self-supporting structure for the storage and the stacks of cassettes in the high temperature thermal energy storage.

4. The method according to claim 1, comprising at least one of the following steps:
   building elongated concrete thermal energy storage elements and elongated cassette frames, and orienting the concrete thermal energy storage elements and cassettes horizontally when arranging the cassettes with the concrete thermal energy storage elements in the high temperature thermal energy storage;
   arranging the pipe system for thermal energy input and output so that the inlet and the outlet to the high temperature thermal energy storage can be changed reversibly and so that at least one inlet or outlet is arranged at a high elevation of the high temperature thermal energy storage and at least one inlet or outlet is arranged at a low elevation of the high temperature thermal energy storage, and arranging the connections and/or valves to the heat exchangers of the thermal energy storage elements so that fluid can be circulated through the heat exchangers gradually or stepwise vertically upwards or downwards or horizontally sideways;
   arranging the cassettes in stacks or blocks with several stacks of cassettes, with the pipe system so that the pipe system is arranged only on one side of the stack or block of elements facing a wall of the high temperature thermal energy storage; and arranging self-supporting cassettes or structure with coupling parts for at least one of roof and wall elements, and at least one of thermally insulated roof and wall elements comprising coupling parts matching the cassette or structure coupling parts, arranging and coupling the elements as thermally insulated roof and walls, respectively.

5. The method according to claim 1, comprising at least one of the following steps:

arranging the concrete thermal energy storage elements in stacks within a frame comprising two opposing sidewalls and floor but no roof, the concrete thermal energy storage elements resting on elements below as contained horizontally orientated within the sidewalls, thereby providing cassettes that are open upwards but easily can be stacked on top of each other;

arranging the concrete thermal energy storage elements in stacks, with inlays, supports or shims between the concrete thermal energy storage elements, at regular or irregular positions along the length of the elements, providing a distance between the elements, the inlays, supports or shims between the elements comprising coupling parts providing a self-supporting cassette structure as stacked and coupled, arranging the concrete thermal energy storage elements in stacks, with support system parts between the elements, the support system parts comprising coupling parts and are arranged at regular or irregular positions along the length of the elements, providing a distance between the elements, the support system parts as coupled provides a self-supporting structure into which the concrete thermal energy storage elements fit;

arranging the concrete thermal energy storage elements in stacks, with support system layers between the concrete thermal energy storage elements, the support system layers comprising coupling parts at regular or irregular positions along the length of the elements, providing a distance between the elements, the support system layers as coupled provides a self-supporting structure including the support system layers as assembled or coupled and stacked, providing a support system with openings into which the concrete thermal energy storage elements fit;

filling a heat transfer and storage medium in the form of a phase change material, in the volume between the elements and a storage housing, or filling the heat transfer and storage medium in the form of a stagnant liquid, in the volume between the elements and a storage housing; or filling the heat transfer and storage medium in the form of a dynamic fluid, in the volume between the elements and a storage housing, so that the dynamic fluid can flow between the elements and cassettes from an inlet to the housing to an outlet from the housing.

6. A high temperature thermal energy storage comprising:
a foundation comprising thermal insulation;
at least one cassette arranged on the foundation, wherein the at least one cassette comprises a frame;
a plurality of concrete thermal energy storage elements contained in the frame, pipe heat exchangers in some or all of said concrete thermal energy storage elements, the pipe heat exchangers are embedded in the concrete of said concrete thermal energy storage elements for the full distance between a pipe heat exchanger inlet and a pipe heat exchanger outlet;

wherein ends of the pipe heat exchangers extend out from the concrete in only one end of the concrete thermal energy storage elements;

wherein the at least one cassette, with the plurality of concrete thermal energy storage elements contained in the frame, is a self-supporting structure for transport and installation as one unit;

a pipe system, the pipe system comprising an inlet and an outlet for thermal input to and output from the high temperature thermal energy storage, respectively, and fluidly coupled to the heat exchangers for circulating fluid through the heat exchangers for thermal energy input to or output from the concrete thermal energy storage elements; and thermal insulation around and on top of the at least one self-supported cassette containing the concrete thermal energy storage elements.

7. The high temperature thermal energy storage according to claim 6, comprising at least one of the following features:
one or several vertical stacks of cassettes;
stacks of cassettes arranged so that the concrete thermal energy storage elements are horizontally orientated;
cassettes arranged with concrete thermal storage elements vertically standing on the foundation;
a pipe system on one side of the cassette or stack of cassettes;
the pipe system arranged so that several stacks of cassettes are coupled in parallel;
the pipe system and cassettes or stacks of cassettes arranged in blocks, so that each block can be isolated or bypassed, one after one or stepwise, from the rest of the storage by operating the pipe system;
the pipe system arranged so that individual thermal elements and individual cassettes can be isolated or bypassed, one after one or stepwise, from the rest of the storage, by operating the pipe system;
the stack or stacks of cassettes closely stacked and arranged;
the cassettes are arranged so that the concrete thermal energy storage elements are horizontally orientated and with the pipe system arranged on one side in a row of stacked cassettes, facing a side of the storage;
a combined outer metal shell of the concrete thermal energy storage element and cassette frame as one structure functioning as a form for casting of concrete, armoring for the concrete, heat transfer fluid leakage catcher and the self-supporting modular cassette structure; and
a heat exchanger for one cassette or concrete thermal energy storage element as one structure.

8. The high temperature thermal energy storage according to claim 6, wherein the concrete thermal energy storage elements comprise:
an outer metal shell, wherein the outer metal shell is closed in one end and open in an opposite end, wherein the outer metal shell is a combined casting form, reinforcement and containment of fluid for thermal energy input or output in case of embedded heat exchanger leakage;
an embedded tube heat exchanger;
hardened concrete or grout inside the outer metal shell, with ends or connections of heat exchangers extending out from the concrete; and
wherein the concrete fills the full volume between the outer metal shell and the pipe heat exchangers.

9. The high temperature thermal energy storage according to claim 6, wherein the pipe system for thermal energy input and output is so that the inlet and the outlet to the storage can be changed reversibly and so that at least one inlet or outlet is arranged at a high elevation of the storage and at least one inlet or outlet is arranged at a low elevation of the storage arranged so that fluid can be circulated through the heat exchangers gradually or stepwise upwards or downwards.

10. The high temperature thermal energy storage according to claim 6, comprising a stack of self-supported cassettes, the cassettes comprising a frame open in at least one end, containing concrete thermal energy storage elements with outer metal shell and tube heat exchangers embedded in the concrete with ends or connections of heat exchangers extending out from the concrete in only one end, the concrete thermal energy storage elements arranged in horizontal orientation in vertical stacks of cassettes, wherein the frame is not only a fixture for casting and curing of the concrete thermal energy storage elements, and a structure for facilitating handling and transport, but also as a structure for the storage itself and the stacks of cassettes in the high temperature thermal energy storage.

11. The high temperature thermal energy storage according to claim 6, comprising self-supporting cassette frames or structure with coupling parts for at least one of roof and wall elements, and at least one of thermally insulated roof and wall elements comprising coupling parts matching the cassette frame or structure coupling parts, arranged and coupled as thermally insulated roof and walls, respectively.

12. The high temperature thermal energy storage according to claim 6, comprising at least one of the following features:
at least two support frames made of assembled support frame parts vertically aligned, staggered or mirror-inverted from layer to layer, wherein the concrete thermal energy storage elements are arranged into and are supported by the at least two frames;
said cassettes comprising a frame comprising two opposing sidewalls and floor but no roof, with the concrete thermal energy storage elements stacked within, the concrete thermal energy storage elements resting on concrete thermal energy storage elements below as contained horizontally orientated within the sidewalls, thereby providing cassettes that are open upwards but easily can be stacked on top of each other;
stacks, with inlays, supports or shims between the concrete thermal energy storage elements, at regular or irregular positions along the length of the elements, providing a distance between the elements, the inlays, supports or shims between the elements comprising coupling parts providing a self-supporting cassette structure as stacked and coupled;
support system parts between the concrete thermal energy storage elements, the support system parts comprising coupling parts and are arranged at regular or irregular positions along the length of the elements, providing a distance between the elements, the support system parts as coupled providing a self-supporting structure including openings into which the concrete thermal energy storage elements fit;
support system layers between the concrete thermal energy storage elements, the support system layers comprising coupling parts at regular or irregular positions along the length of the elements, providing a distance between the elements, the support system layers as coupled providing a self-supporting structure including the support system layers as assembled or coupled and stacked, providing a support system with openings into which the concrete thermal energy storage elements fit;
a heat transfer and storage medium in the form of a phase change material in a volume between the elements and a housing; or
the heat transfer and storage medium in the form of a stagnant liquid, in the volume between the elements and a housing; or
the heat transfer and storage medium in the form of a dynamic fluid, in the volume between the elements and a housing, the dynamic fluid can flow from an inlet to the housing to an outlet from the housing.

13. A method of operating a high temperature thermal energy storage, wherein the high temperature thermal energy storage is according to claim 6, the method comprising:
to circulate warmer than the storage heat transfer fluid, for thermal energy input to the high temperature thermal energy storage, stepwise or gradually from a higher elevation to a lower elevation in the storage, by operating the pipe system accordingly; and
to circulate colder than the storage heat transfer fluid, for thermal energy output from the storage, stepwise or gradually from a lower elevation to a higher elevation in the high temperature thermal energy storage, by operating the pipe system accordingly.

14. The method according to claim 13, wherein the high temperature thermal energy storage contains a phase change material in the volume between the concrete thermal energy storage elements and the housing, and water is circulated through heat exchangers embedded in the elements when thermal energy is taken out from the storage, wherein the storage is operated at conditions so that the phase change material solidifies whilst the water evaporates, thereby using the heat of solidification of the phase change material as heat of evaporation for the water.

15. The method according to claim 13, for operating the high temperature thermal energy storage with a thermal oil or other single-phase liquid as heat transfer fluid, wherein:
the circulation for thermal energy input to the high temperature thermal energy storage, is via an inlet at a highest elevation of the storage, directing the warmer fluid to the uppermost elements or elements at an elevation with temperature lower than the warmer fluid; and
the circulation for thermal energy output from the high temperature thermal energy storage, is via an inlet at a lowest elevation of the storage, directing the colder fluid to the lowermost elements or elements at an elevation with temperature higher than the colder fluid.

16. The method of operating a high temperature thermal energy storage, wherein the high temperature thermal energy storage is according to claim 6, for operating the storage with water/steam, LPG or other two-phase liquid-gas mixture as heat transfer fluid, with concrete thermal energy storage elements oriented horizontally, enabling natural circulation by gravity without the use of a pump, by the difference in density between gas and liquid, the high temperature thermal energy storage acting as a condenser when the high temperature thermal energy storage is charging and a boiler when the high temperature thermal energy storage is discharging thermal energy, the method comprising:
adding steam or other gas via an inlet at a lowest elevation of the storage when charging thermal energy;
adding water or other liquid via an inlet at the highest elevation of the storage; and wherein liquid flows downwards in the external pipe(s) and liquid-gas mix flows upwards in the storage, in both charge and discharge modes.

17. A high temperature thermal energy storage comprising:
   a foundation comprising thermal insulation;
   at least one frame arranged on the foundation;
   a plurality of concrete thermal energy storage elements contained in the at least one frame;
   pipe heat exchangers in some or all of said plurality of concrete thermal energy storage elements, the pipe heat exchangers are embedded in the concrete of said plurality of concrete thermal energy storage elements for a distance between a pipe heat exchanger inlet and a pipe heat exchanger outlet, wherein ends of the pipe heat exchangers extend out from the concrete in only one end of the elements, wherein the at least one frame, with the plurality of concrete thermal energy storage elements contained in the frame, is a self-supporting structure for transport and installation as one unit;
   a pipe system, the pipe system comprising an inlet and an outlet for thermal input to and output from the high temperature thermal energy storage, respectively, and fluidly coupled to the heat exchangers for circulating fluid through the heat exchangers for thermal energy input to or output from the concrete thermal energy storage elements; and
   thermal insulation around and on top of the at least one self-supported cassette containing the plurality of concrete thermal energy storage elements.

18. A high temperature thermal energy storage comprising:
   a foundation comprising thermal insulation;
   at least one frame arranged on the foundation;
   a plurality of concrete thermal energy storage elements contained in the at least one frame, wherein the plurality of concrete thermal energy storage elements comprise:
      an outer metal shell, wherein the outer metal shell is closed in one end and open in an opposite end, wherein the outer metal shell is a combined casting form, reinforcement and containment of fluid for thermal energy input or output in case of embedded heat exchanger leakage;
      an embedded tube heat exchanger;
      hardened concrete or grout inside the outer metal shell, with ends or connections of pipe heat exchangers extending out from the concrete, wherein the concrete fills the full volume between the outer metal shell and the pipe heat exchangers, wherein the at least one frame, with the plurality of concrete thermal energy storage elements contained in the at least one frame, is a self-supporting structure for transport and installation as one unit;
   a pipe system, the pipe system comprising an inlet and an outlet for thermal input to and output from the high temperature thermal energy storage, respectively, and fluidly coupled to the pipe heat exchangers for circulating fluid through the heat exchangers for thermal energy input to or output from the plurality of concrete thermal energy storage elements; and
   thermal insulation around and on top of the at least one self-supported cassette containing the concrete thermal energy storage elements.

\* \* \* \* \*